United States Patent
Morita et al.

[11] Patent Number: 6,009,999
[45] Date of Patent: Jan. 4, 2000

[54] MAGNETIC TAPE CASSETTE STORAGE CASE

[75] Inventors: Kiyoo Morita; Katsuki Asano; Kazuo Hiraguchi, all of Kanagawa, Japan

[73] Assignee: Fuji Photo Film Co., Ltd., Kanagawa, Japan

[21] Appl. No.: 09/115,246

[22] Filed: Jul. 14, 1998

[30] Foreign Application Priority Data

Jul. 14, 1997 [JP] Japan .................................. 9-188387

[51] Int. Cl.[7] .............................................. B65D 85/672
[52] U.S. Cl. .............................. 206/387.13; 206/387.1; 206/493
[58] Field of Search ........................ 206/387.1, 387.12, 206/387.13, 493

[56] References Cited

U.S. PATENT DOCUMENTS

| | | |
|---|---|---|
| 3,876,071 | 4/1975 | Neal et al. . |
| 4,184,594 | 1/1980 | Hehn . |
| 4,291,801 | 9/1981 | Basili et al. ........................ 206/387.1 |
| 4,365,711 | 12/1982 | Long et al. ........................ 206/387.13 |
| 4,512,470 | 4/1985 | Sieben ............................... 206/387.1 |
| 5,499,714 | 3/1996 | Konno ............................... 206/387.1 |
| 5,605,227 | 2/1997 | Morita ............................... 206/387.1 |

FOREIGN PATENT DOCUMENTS

| | | |
|---|---|---|
| 0 136 753 A1 | 4/1985 | European Pat. Off. . |
| 2 563 505 | 10/1985 | France . |
| 2 281 067 | 2/1995 | United Kingdom . |

Primary Examiner—Paul T. Sewell
Assistant Examiner—J. Mohandesi
Attorney, Agent, or Firm—Sughrue, Mion, Zinn, Macpeak & Seas, PLLC

[57] ABSTRACT

A mis-insertion preventive rib 15 which will fit in the front opening that is formed in the magnetic tape cassette is provided at the storage part 3 which constitutes the magnetic tape cassette storage case 1 and, to facilitate visual and palpable recognition, the height H1 of the lateral wall part 13 which is formed at the outer circumferential part of the storage part 3 is designed so as to be smaller than the height H2 of the mis-insertion preventive rib 15 so as not to be supported between the lateral walls 13 but to protrude from the lateral wall part 13 when the magnetic tape cassette is inserted incorrectly. Therefore, at the time to store the magnetic tape cassette in the storage case, if the mis-insertion preventive rib does not fit in the front opening, the insertion in the incorrect direction can be checked visually by the entire magnetic cassette protruding from the lateral walls. Since the magnetic tape cassette which protrude from the lateral wall part is not supported between the lateral walls, the lid part is difficult to be closed even if tried and thus the incorrect mounting state is quickly recognized.

10 Claims, 4 Drawing Sheets

MAGNETIC TAPE CASSETTE STORAGE CASE

BACKGROUND OF THE INVENTION

The present invention relates to a case wherein a magnetic tape cassette, such as a digital video cassette (DVC), is stored and specifically relates to a structure for the prevention of incorrect insertions which are liable to occur at the time to store a magnetic tape cassette.

There have been proposed various types of magnetic tape cassette storage cases (hereinafter referred to simply as a storage case) so as to match the modes of the magnetic tape cassettes to be stored therein. An example of a conventional storage case and that of a magnetic tape cassette are described now with references to FIGS. 1 and 2.

As shown in FIG. 1, a storage case 41 comprises a storage part 43 for storing a magnetic tape cassette 81 that is shown in FIG. 2, a lid part 45 and a hinge part 47. The storage part 43 comprises a flat plate part 51, a lateral wall part 53 which is integrally formed at an outer circumferential part thereof, and reel lock ribs 55a and 55b which are formed at a part comparatively close to a rear end of the flat plate part 51. If stored appropriately, the magnetic tape cassette 81 that is shown in FIG. 2 is fitted inside the lateral wall part 53 as indicated by imaginary lines in FIG. 1.

The lid part 45 comprises a flat plate part 61 and a lateral wall part 63 which is integrally formed on three sides of the outer circumferential part thereof. The hinge part 47 comprises thin grooves 73a and 73b formed on both sides of a plate part 71 and these grooves 73a and 73b function to close the storage part 43 and the lid part 45 like a book.

A flange 51a which is formed of the flat plate part 51 protruding outward is provided on the outside of the lateral wall part 53 which constitutes the storage part 43. When the storage part 43 is closed by the lid part 45, the outer sides of the lateral wall part 53 of the storage part 43 are covered by the lateral wall part 63 of the lid part 45 and, since the storage part 43 is prevented from plunging into the lid part 45 with provision of the flange part 51a, the entire case can retain a certain thickness.

On an inner surface of the lateral wall part 63, a lock part 53a is formed as a recess in an outer surface of the lateral wall part 53 and a locking projection 63a is formed at a position which corresponds to the lock part 53a when the storage part 43 is closed by the lid part 45. When the storage part 43 is fully closed by the lid part 45, the lock part 53a is locked by the locking projection 63a to prevent the storage part 43 and the lid part 45 from being opened unexpectedly.

The magnetic tape cassette 81 is now described with references to FIG. 2. FIG. 2 is a perspective view of the magnetic tape cassette 81 from the bottom side thereof, wherein the upper half case 83 is shown on the lower side while the lower half case 85 is shown on the upper side. Two round openings 87a and 87b are formed in the lower half case 85 with exposure of engagement parts 89a and 89b that are integral parts of reel hubs which a magnetic tape is wound around (these are not shown in the figure).

The functions imparted to the engagement parts 89a and 89b are to feed out and wind up the magnetic tape while mounted on a VTR and to lock the magnetic tape cassette 81 onto the reel lock ribs 55a and 55b for prevention of loose movement thereof while stored in the storage case 41.

An outer lid 91 is provided on the front side of the magnetic tape cassette 81 so as to be rotated freely and, if mounted on the VTR or such, the magnetic tape is pulled out after the outer lid 91 has been rotated in a direction indicated by an arrow A in FIG. 2. A recession of a front opening 93 is formed approximately at the inside center of the outer lid 91 as if by incising the upper and lower half cases 83 and 85 and, on an edge of the front opening 93, a stepped part 95 is formed. These respectively function as predetermined when the magnetic tape cassette 81 is mounted on the VTR.

When the magnetic tape cassette 81 is stored in the storage case 41, the magnetic tape cassette 81 is fitted inside the lateral wall part 53 as indicated by imaginary lines in FIG. 1 and pushed in while the reel lock ribs 55a and 55b are inserted into round engagement holes B which are formed at the centers of the engagement parts 89a and 89b. Being moderately elastic, the reel lock ribs 55a and 55b are lightly pressure-inserted into the engagement holes B and thus the magnetic tape cassette 81 is stored inside the storage case 41.

The structure of the storage case 41, however, has such a problem as below at the time to store the magnetic tape cassette 81. That is, even if the magnetic tape cassette 81 is placed with the rear side front, the magnetic tape cassette can be supported between the lateral walls 53 and, since the reel lock ribs 55a and 55b are moderately elastic, the lid part 45 can be closed to some extent when the lid part 45 is pressed strongly. In this case, it may happen that the magnetic tape cassette 81 is deformed by pressure at inappropriate positions in contact with the reel lock ribs 55a and 55b.

SUMMARY OF THE INVENTION

In view of the above-described circumstances, the present invention is purposed to provide a magnetic tape cassette storage case which always realizes insertion a correct direction by no mistake at the time to store a magnetic tape cassette in the storage case.

The above-described object of the present invention is achieved by a magnetic tape cassette storage case which comprises a storage part for storing a magnetic tape cassette, a lid part provided for covering the storage part, a hinge part for joining the storage part and the lid part so as to be opened and closed freely, and a lateral wall part which is provided at an outer circumferential part of a flat plate part which constitutes the storage part, and which is unique in that the flat plate part is provided with a mis-insertion preventive rib that will fit in a recessed front opening which is formed in the magnetic tape cassette and also that the lateral wall part is designed to be lower than the mis-insertion preventive rib.

The storage case is provided with the mis-insertion preventive rib that will fit in the front opening of the magnetic tape cassette. The lateral wall part which is provided at the outer circumferential part of the storage part is designed to be lower than the mis-insertion preventive rib. Therefore, at the time to store the magnetic tape cassette in the storage case, if the mis-insertion preventive rib does not fit in the front opening, the insertion in the incorrect direction can be checked visually by the entire magnetic cassette protruding from the lateral walls. In this case, the magnetic tape cassette which cannot be supported between the lateral walls is free to move, the incorrect mounting state is surely recognized.

The loose movement of the magnetic tape cassette can be prevented by a configuration of the mis-insertion preventive rib that will correctly fit in the opening of the magnetic tape cassette.

DETAILED DESCRIPTION OF THE PREFERRED EMBODIMENTS

With reference to the drawings, an embodiment of the magnetic tape cassette storage case related to the present invention is now described.

Figure 1:
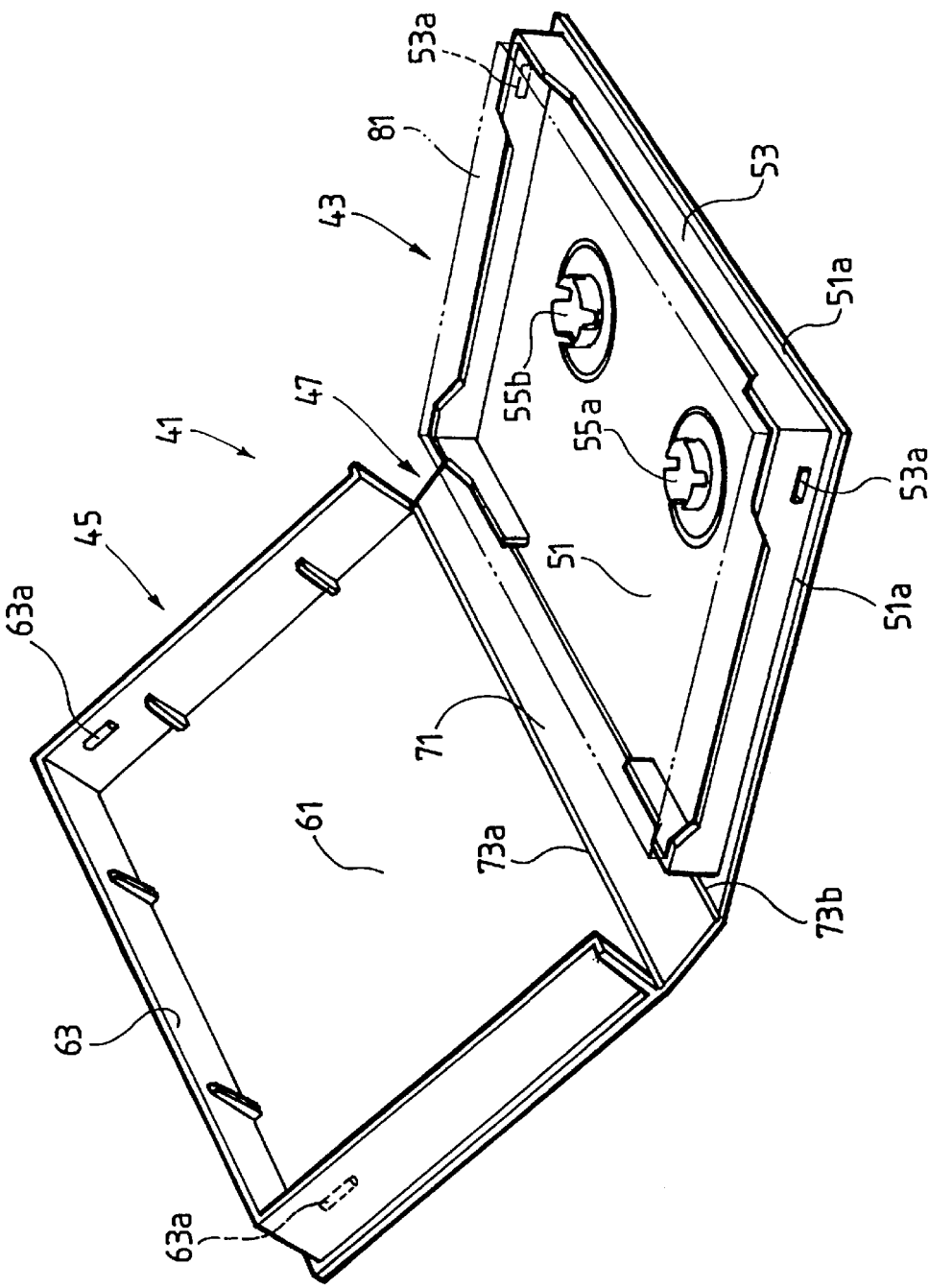
FIG. 1 is an perspective view of an example of the conventional magnetic-tape cassette storage case.
Figure 2:
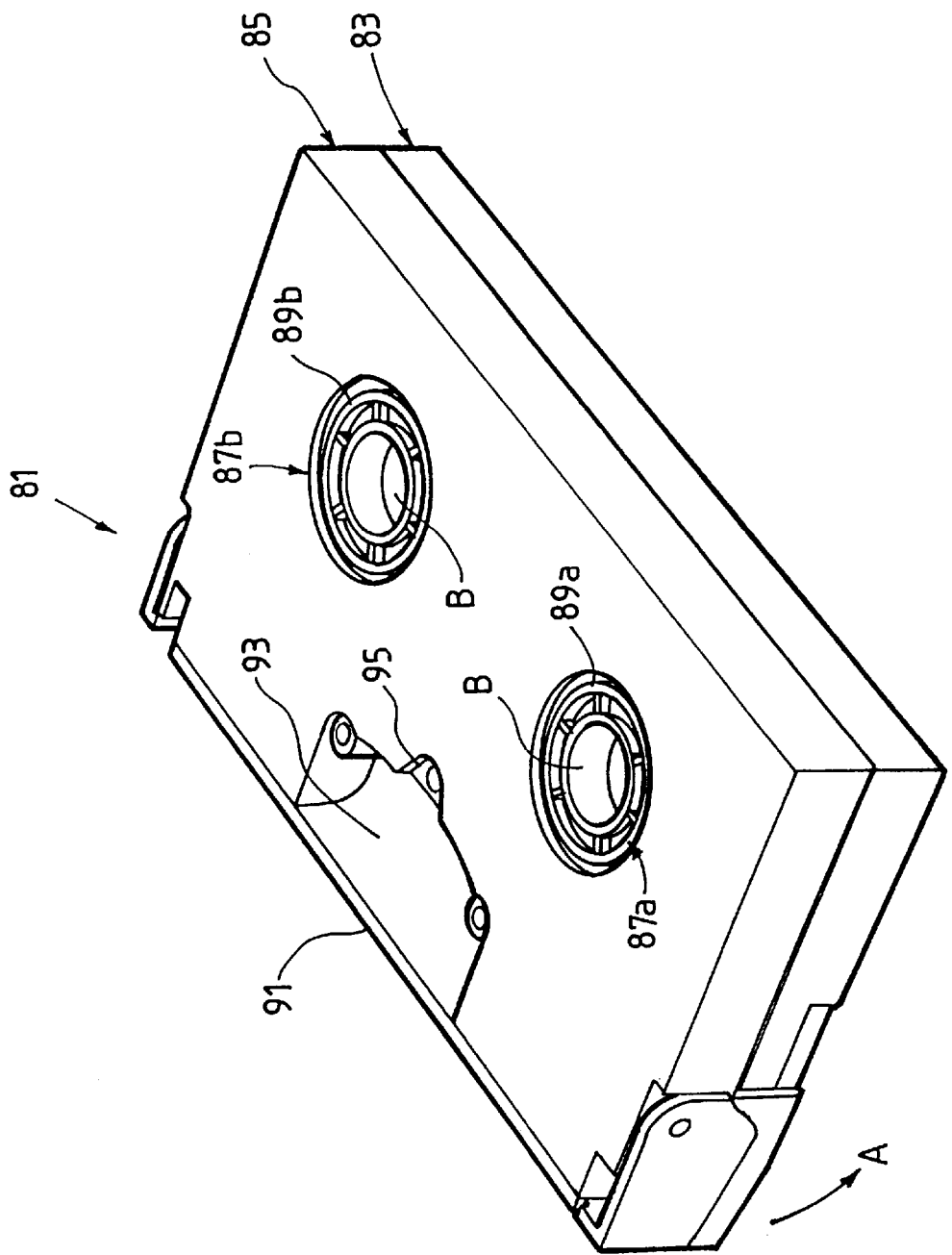
FIG. 2 is a perspective view of an example of the magnetic tape cassette.
Figure 3:
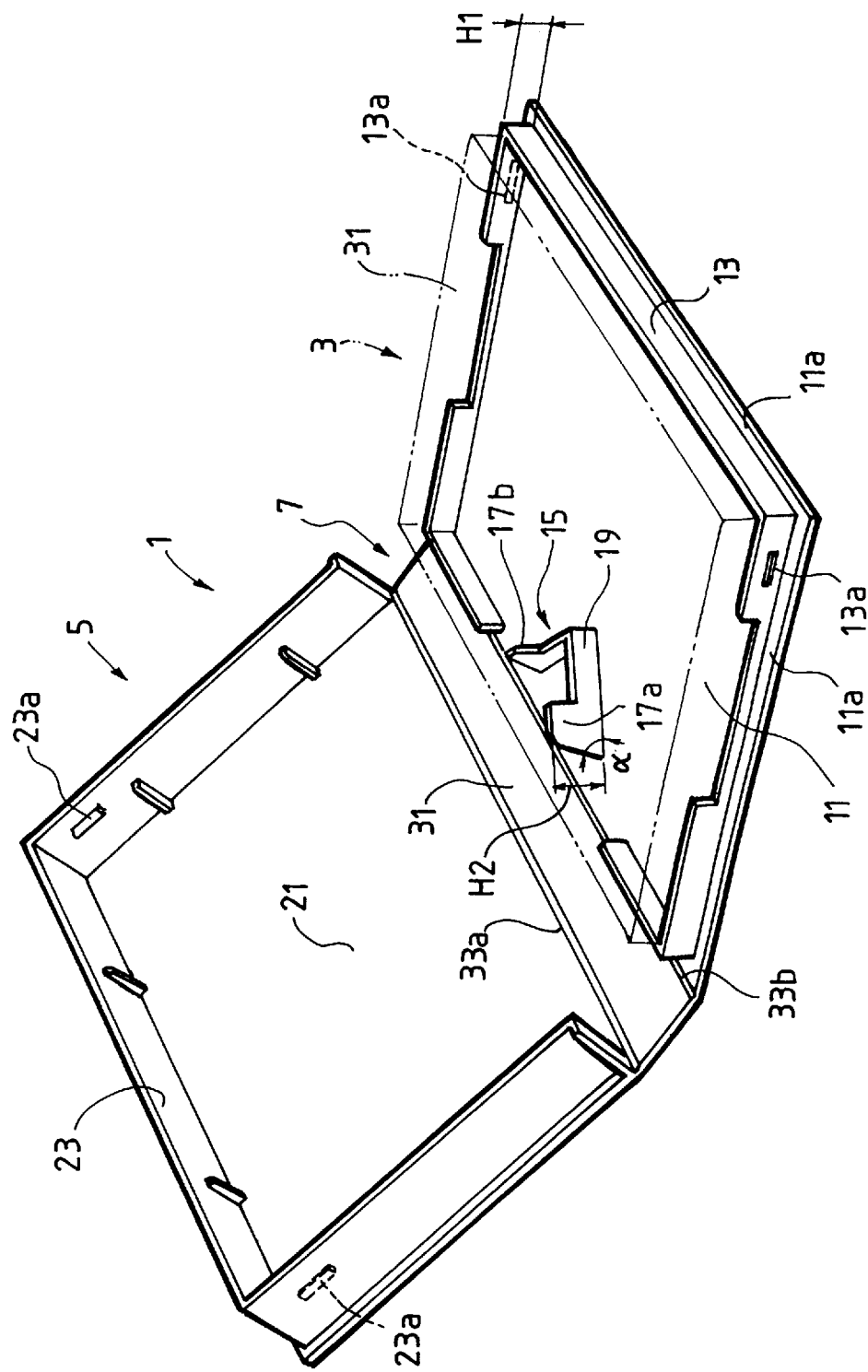
FIG. 3 is a perspective view of the magnetic tape cassette storage case as a embodiment of the present invention.
Figure 4:
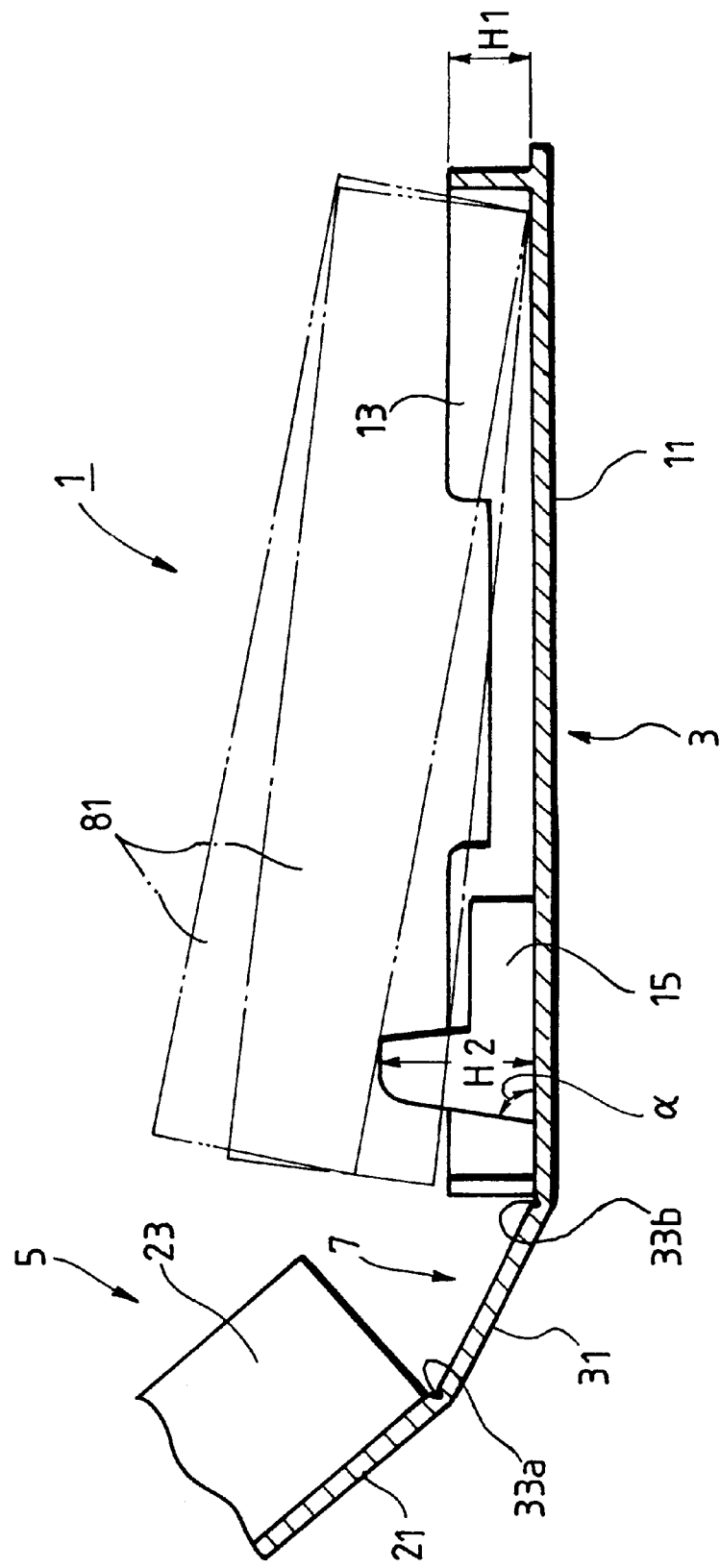
FIG. 4 is a sectional drawing which shows a state wherein the magnetic tape cassette is inserted.

FIG. 3 is a perspective drawing which shows the structure of the magnetic tape cassette storage case and FIG. 4 is a sectional drawing which shows a storage state of the magnetic tape cassette in the storage case. In the descriptions on the embodiment, the magnetic tape cassette shown in FIG. 2 is utilized if appropriate.

A storage case 1 is formed of resin in a single piece which has a structure wherein a storage part 3 and a lid part 5 are joined by a hinge part 7. The storage part 3 comprises a flat plate part 11, a lateral wall part 13 which is integrally formed at an outer circumferential part thereof, and mis-insertion preventive rib 15 which is formed at a part comparatively close to a front end of the flat plate part 11. If stored appropriately, the magnetic tape cassette 81 which has been shown in the example of the conventional one is fitted inside the lateral wall part 13 as indicated by imaginary lines in FIG. 3.

The lid part 5 comprises a flat plate portion 21 and a lateral wall part 23 which is integrally formed on three sides of the outer circumferential part thereof. The hinge part 7 comprises thin grooves 33a and 33b on both sides of a plate part 31 and these grooves 33a and 33b function to close the storage part 3 and the lid part 5 like a book.

A flange 11a which is formed by protruding a part of the flat plate part 11 outward is provided on the outside of the lateral wall part 13 which constitutes the storage part 3. When the storage part 3 is closed by the lid part 5, the outer sides of the lateral wall part 13 of the storage part 3 are covered by the lateral wall part 23 of the lid part 5 and, since the storage part 3 is prevented from plunging into the lid part 5 with provision of the flange part 11a, the entire storage case 1 can retain a certain thickness. Consequently, even if the height H1 of the lateral wall part 13 is smaller than the height (or thickness) of the magnetic tape cassette 81 as shown in FIG. 3, unnecessary force is applied to the magnetic tape cassette 81.

A lock part 13a is formed as a recess in an outer surface of the lateral wall part 13 and a locking projection 23a is formed, at a position which corresponds to the lock part 13a, on an inner surface of the lateral wall part 23, when the storage part 3 is closed by the lid part 5. When the storage part 3 is fully closed by the lid part 5, the lock part 13a is locked by engagement with the locking projection 23a to prevent the storage part 3 and the lid part 5 from being opened unexpectedly. The positions and quantity of the lock part 13a and the locking projections 23a are not limited to the mode in FIG. 3 but available in various alterations.

The mis-insertion preventive rib 15 is now described. The mis-insertion preventive rib 15 is a utilization of the front opening 93 and the stepped part 95 described with references to FIG. 2, which allows storage of the magnetic tape cassette 81 without application of excessive force and also without loose movement thereof inside the storage case 1.

That is, the mis-insertion preventive rib 15 is formed in a V shape on a plane surface, wherein the end parts 17a and 17b on the open side are designed to be of height H2 so as to be inserted into the front opening 93 while the base part 19 of the wedge shape is designed to be of such a height as to match the depth of the stepped part 95. In similar to this, the tip end configuration defined by the base part 19 of the V shaped mis-insertion preventive rib 15 may be designed so as to match the stepped part 95. The height H2 of the end parts 17a and 17b and the height H1 of the lateral wall part 13 are designed to be in the relationship H2>H1.

In addition to this, the opening angle at the tip end of the base part 19 is preferably designed so as to match the stepped part 95. Further, each of the end parts 17a and 17b is advantageously tapered by an angle α so as to be easily inserted into the front opening 93 as shown in FIG. 3.

At the time to store the magnetic tape cassette 81 in the storage case 1, the magnetic tape cassette 81 is inserted to the inside of the lateral wall part 13, in the opposite manner of the one shown in FIG. 2, with the front opening 93 side down and also with the front opening 93 facing the mis-insertion preventive rib 15.

If storage of the magnetic tape cassette 81 is attempted with a rear side to the front at this stage, the magnetic tape cassette 81 rides on the mis-insertion preventive rib 15, as shown by imaginary lines in FIG. 4, to be tilted at a sharp angle with the rear side floated up.

In the storage cassette 1, the mis-insertion preventive rib 15 is designed so as to have the height H2 while the lateral wall 13 has the lower height of H1. Therefore, if the magnetic tape cassette 81 is tilted as described above, the magnetic tape cassette 81 protrudes from the lateral wall 13, irrelevant to the tilt angle. For this reason, a user can visually recognize the incorrect insertion of the magnetic tape cassette 81 with ease. Since the magnetic tape cassette 81 is not supported between the lateral walls 13, incorrect storage position is surely recognized palpably.

In a case wherein the magnetic tape cassette 81 is placed in the correct direction but deviated to the front and rear or to the right and left and thus the mis-insertion preventive rib 15 and the front opening 93 are aligned, the front side of the magnetic tape cassette 81 will floats up and the entire body will be tilted at a sharp angle, in the same way as above.

On the other hand, in a case wherein the end parts 17a and 17b of the mis-insertion preventive rib 15 fit inside the front opening 93 but wherein the base part 19 does not fit inside the stepped part 95, the magnetic tape cassette 81 will be tilted at a dull angle, as indicated by one-dot-and-one-dash-alternating line in FIG. 4.

However, if the magnetic tape cassette 81 is tilted while riding on the mis-insertion preventive rib 15, in the same way as above, the magnetic tape cassette 81 will protrude from the lateral wall 13, irrelevant to the tilt angle. Therefore, in the same way as above, it is certain that the user can visually and palpably recognize any incorrect insertion of the magnetic tape cassette 81.

For correct insertion, the magnetic tape cassette 81 should not be pushed in but moved slightly back and forth and to the right and left. That is, since the magnetic tape cassette 81 is not pushed in at the time of storing, no excessive force is applied to the magnetic tape cassette 81, and thus such a problem as deformation will not occur.

If the magnetic tape cassette 81 is correctly inserted to the inside of the lateral wall part 13 from the first stage, the front opening 93 fits correctly to the end parts 17a and 17b and the stepped part 95 fits correctly to the base part 19 so as to be fitted flat inside the lateral wall part 13 as shown by imaginary lines in FIG. 3. If the lid part 5 is closed in this state, the magnetic tape cassette 81 is stored correctly and the lock mechanism will act for safe conveyance and safekeeping with prevention of unexpected opening operations.

As described above, in the magnetic tape cassette storage case related to the present invention, the mis-insertion preventive rib which will fit in the front opening that is formed in the magnetic tape cassette is provided at the storage part for the storing of the magnetic tape cassette and the lateral wall part which is provided at the outer circumferential part of the storage part is designed to be lower than the mis-insertion preventive rib.

Therefore, at the time to store the magnetic tape cassette in the storage case, if the mis-insertion preventive rib does not fit in the front opening, the insertion in the incorrect direction can be checked visually by the entire magnetic cassette protruding from the lateral walls. Since the magnetic tape cassette which protrudes from the lateral wall part is not supported between the lateral walls, the lid part is difficult to be closed even if tried and thus the incorrect mounting state is quickly recognized.

Although the present invention has been described in connection with the various preferred embodiments, it will be obvious to those skilled in the art that various changes and modifications may be made therein without departing from the invention, and it is aimed, therefore, to cover in the appended claim all such changes and modifications as fall within the true spirit and scope of the invention.

What is claimed is:

1. A magnetic tape cassette storage case for storing a digital video cassette, the digital video cassette having a recessed front opening including a first stepped part and a second stepped part, said magnetic tape cassette storage case comprising:

a storage part, said storage part having a flat plate part;

a lateral wall part which is provided at an outer circumferential part of said flat plate part;

a lid part provided to cover said storage part;

a hinge part for joining said storage part and said lid part so as to be opened and closed freely; and a mis-insertion preventive rib formed in a V shape on said flat plate part which is fittable into said recessed front opening formed in said digital video cassette, and wherein said mis-insertion preventive rib includes a first portion mating with said first stepped part at a base part of said V shape and a second portion mating with said second stepped part at end parts of said V shape; and wherein the height of said lateral wall part is smaller than the height of said second portion; and wherein a mistakenly inserted digital video cassette is tilted at an angle to said flat plate part.

2. The magnetic tape cassette storage case according to claim 1, in which said lid part has a flat plate portion and a lateral wall part which is provided at an outer circumferential part of said flat plate part.

3. A magnetic tape cassette storage case as in claim 1, wherein:

said mis-insertion preventive rib is higher near a perimeter of said storage part.

4. The magnetic tape cassette storage case according to claim 1, in which said V-shaped mis-insertion preventive rib comprises a base part and a pair of end parts extended from said base part.

5. The magnetic tape cassette storage case according to claim 4, in which each of said end parts is than said lateral wall part.

6. The magnetic tape cassette storage case according to claim 4, in which each of said end parts is tapered.

7. A magnetic tape cassette storage case comprising:

a storage part, said storage part having a flat plate part;

a lateral wall part which is provided at an outer circumferential part of said flat plate part;

a lid part provided to cover said storage part;

a hinge part for joining said storage part and said lid part so as to be opened and closed freely; and a mis-insertion preventive rib formed in a V-shape on said flat plate part which is fittable into a recessed front opening formed in a magnetic tape cassette;

wherein the height of said lateral wall part is smaller than the height of said mis-insertion preventive rib and a mistakenly inserted magnetic tape cassette is tilted at an angle to said flat plate part.

8. The magnetic tape cassette storage case according to claim 7, wherein said V-shaped mis-insertion preventive rib comprises a base part and a pair of end parts extending from said base part, and wherein a height of said base part is less than a height of said pair of and parts extending from said base part.

9. A magnetic tape cassette storage case comprising:

a storage part, said storage part having a flat plate part;

a lateral wall part which is provided at an outer circumferential part of said flat plate part;

a lid part provided to cover said storage part;

a hinge part for joining said storage part and said lid part so as to be opened and closed freely; and a mis-insertion preventive rib formed in a V-shape on said flat plate part which is fittable into a recessed front opening formed in a magnetic tape cassette;

wherein the height of said lateral wall part is smaller than the height of said mis-insertion preventive rib and said mis-insertion preventive rib is formed to match a depth of said recessed front opening.

10. The magnetic tape cassette storage case according to claim 9, wherein said V-shaped mis-insertion preventive rib comprises a base part and a pair of end parts extending from said base part, and wherein a height of said base part is less than a height of said pair of and parts extending from said base part.

* * * * *

UNITED STATES PATENT AND TRADEMARK OFFICE
CERTIFICATE OF CORRECTION

PATENT NO.: 6,009,999
DATED: January 4, 2000
INVENTOR(S): Kiyoo MORITA, Katsuki ASANO, and Kazuo HIRAGUCHI It is certified that errors appear in the above-identified patent and that said Letters Patent is hereby corrected as shown below:

column 5, line 32, delete "digital" (both occurrences)

column 5, line 45, delete "digital"; and column 5, line 54, delete "digital".

Signed and Sealed this

Twenty-fourth Day of October, 2000

*Attest:*

Q. TODD DICKINSON

*Attesting Officer*      *Director of Patents and Trademarks*